United States Patent [19]

Braun et al.

[11] Patent Number: 4,794,624
[45] Date of Patent: Dec. 27, 1988

[54] METHOD FOR CLOCK SYNCHRONIZATION OF A SIGNAL RECEIVER

[75] Inventors: Walter Braun, Wettingen; Joachim Habermann, Baden-Rütihof, both of Switzerland

[73] Assignee: BBC Brown, Boveri & Company, Limited, Baden, Switzerland

[21] Appl. No.: 938,955

[22] Filed: Dec. 8, 1986

[30] Foreign Application Priority Data

Jan. 17, 1986 [CH] Switzerland ............... 176/86

[51] Int. Cl.$^4$ ............... H04L 7/00; H04B 14/04; H03K 5/00
[52] U.S. Cl. ............... 375/108; 328/151; 375/26; 375/95; 341/122
[58] Field of Search ............... 375/26, 106, 108, 95; 340/347 SH; 328/151

[56] References Cited

U.S. PATENT DOCUMENTS

| | | |
|---|---|---|
| 3,984,777 | 10/1976 | Noguchi ............... 375/118 X |
| 4,328,587 | 5/1982 | Mizuno et al. ............... 375/118 X |
| 4,443,883 | 4/1984 | Berger ............... 375/110 X |
| 4,539,524 | 9/1985 | Goode ............... 375/110 X |
| 4,563,637 | 1/1986 | De Bortoli et al. ............... 328/151 X |

FOREIGN PATENT DOCUMENTS

| | | |
|---|---|---|
| 3417358 | 11/1985 | Fed. Rep. of Germany ...... 375/108 |
| 2493646 | 6/1982 | France . |

*Primary Examiner*—Stephen C. Buczinski
*Assistant Examiner*—Linda J. Wallace
*Attorney, Agent, or Firm*—Oblon, Fisher, Spivak, McClelland, & Maier

[57] ABSTRACT

In a method for clock synchronization of a signal receiver, the demodulated received signal is sampled in each of the subintervals over N time windows having in each case K subintervals (1A . . . 4C). In each case, the dispersion is calculated for the sampled values of N corresponding subintervals and the K dispersion values obtained are compared with each other. The optimum sampling time is derived from the position in time of the minimum dispersion value.

10 Claims, 3 Drawing Sheets

METHOD FOR CLOCK SYNCHRONIZATION OF A SIGNAL RECEIVER

FIELD OF THE INVENTION

The present invention relates generally to a method for clock synchronization and more particularly to a method for clock synchronization of a signal receiver with respect to a received signal modulated with data in the form of a baseband signal. The baseband signal, in the undisturbed condition, can assume a plurality of permitted values at particular points of time which are periodically related to a predetermined symbol duration. In this arrangement the generating data sequence is uncorrelated in such a manner that transitions between the permitted values occur largely with the same frequency in arbitrary time windows.

DISCUSSION OF BACKGROUND

The received signal, containing a baseband signal, in a communication system generally reaches the signal receiver noisy and distorted due to a non-ideal transmission. If the signal receiver is, for example, a radio receiver and if the associated communication path is, for example, a mobile radio channel, considerble and rapidly varying distortions occur in the received signal due to multi-path propagation. During the transmission of digital data via such a channel, it is of importance for the extraction of the data from the received signal to be able to find, virtually without delay and reliably, the optimum sampling time for each of the transmitted symbols.

Known methods for clock synchronization, that is to say for adjustment to the correct sampling time at each time, are based on the detection of the zero transitions of the received signal or on a non-linear conversion (for example a squaring process) with subsequent narrow-band filtering.

The first of these methods suffers from the fact that the optimum sampling time can become displaced with respect to the time of the zero transition in the case of distorted signals.

In the second of these methods, there is also no rigid relationship between the phase of the filtered signal and the optimum sampling time. In addition, the narrow-band filtering leads to considerable delays.

SUMMARY OF THE INVENTION

The present invention has the object, therefore, of finding a method for clock synchronization of a signal receiver which allows the optimum sampling time to be determined directly and without detours via other measuring variables and thus avoids the inaccuracies of the known methods.

The method according to the invention directly utilizes the characteristics of the optimum sampling time. This is because this point is defined by the fact that the noise-free, undisturbed demodulated received signal in each case assumes one of a few permitted values at this point of a symbol interval. These permitted values are not precisely assumed in the case of distorted signals. However, the actual deviation is at a minimum.

According to the method of the invention, the minimum of the deviation between the permitted value and the actual signal value at the optimum sampling time is determined by sampling the demodulated received signal, in each case, at K subintervals per time window in N sucessive time windows within the length of the symbol duration.

The standard deviation of these sampled values is determined from the N sampled values of corresponding subintervals in each of the N time windows. The K standard deviations determined are then compared with each other and the smallest of these standard deviation values is determined.

The optimum sampling time can then be derived from the position of this smallest standard deviation value in time, that is to say, from that subinterval which has contributed the corresponding contribution to calculating this smallest standard deviation for each time window. The smaller this standard deviation, the smaller the error in the evaluation of the received signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
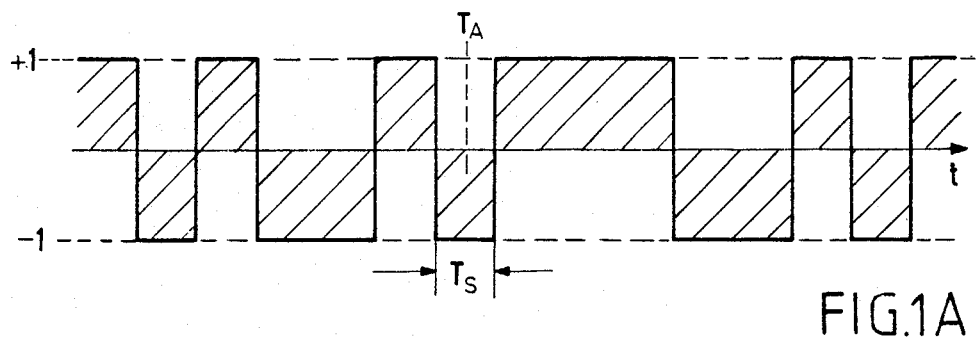
FIG. 1A shows the example of a binary baseband signal having the permitted values $+1$ and $-1$.

Various other objects, features and attendant advantages of the present inventon will be more fully appreciated as the same becomes better understood from the following detailed description when considered in connection with the accompanying drawings in which like reference characters designate like or corresponding parts throughout the several views and wherein FIG. 1A shows a binary baseband signal which is capable of assuming the permitted values $+1$ and $-1$, the actual signal level of which therefore jumps back and forth, for example between $+1V$ and $-1V$.

The baseband signal is subdivided into a continuous sequence of symbol intervals having a symbol duration $T_S$. Each symbol interval contains one information bit. To extract the information contained from the baseband signal, the latter must be sampled at least once in each symbol interval at a sampling time $T_A$.

In the case of an undistorted and undisturbed baseband signal according to FIG. 1A, the position of the sampling time $T_A$ within a symbol interval is largely without influence on the error rate of the evaluation.

Thus, the sampling time $T_A$ can be located in the middle of the symbol interval, as shown in FIG. 1A; but it can also be shifted to the boundaries of the symbol interval without impairing the quality of evaluation.

Figure 1B:
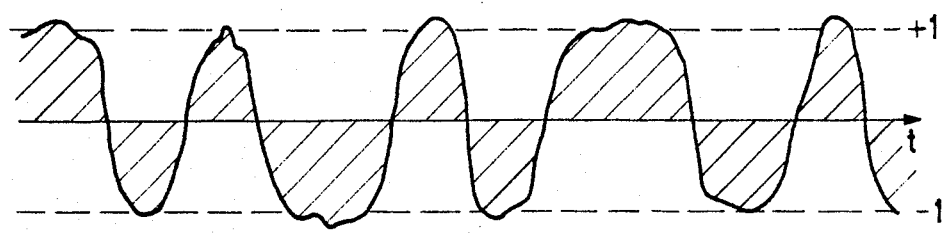
FIG. 1B shows the baseband signal from FIG. 1A after transmission, including the corresponding distortions.

However, the choice of sampling time $T_A$ within the symbol interval is no longer freely selectable without impairment if after the transmisson the baseband signal is only present in distorted and noisy form as shown in FIG. 1B. Synchronization in the receiver must then be effected in such a manner that the sampling time $T_A$ assumes an optimum position in the symbol intervals so that the evaluation errors remain as small as possible.

Synchronization, and thus the optimum sampling time $T_A$ are achieved precisely by utilizing the characteristics of optimum sampling, namely of enabling the information to be extracted as accurately as possible.

The prerequisite for this is firstly that the length of the symbol duration $T_S$ is known in the receiver. In addition, it must be assumed that the generating data sequence of the baseband signal is scrambled to such an extent that transitions between the permitted values, $+1$ and $-1$ in this case, largely occur with the same frequency in arbitrary time windows.

Figure 2:
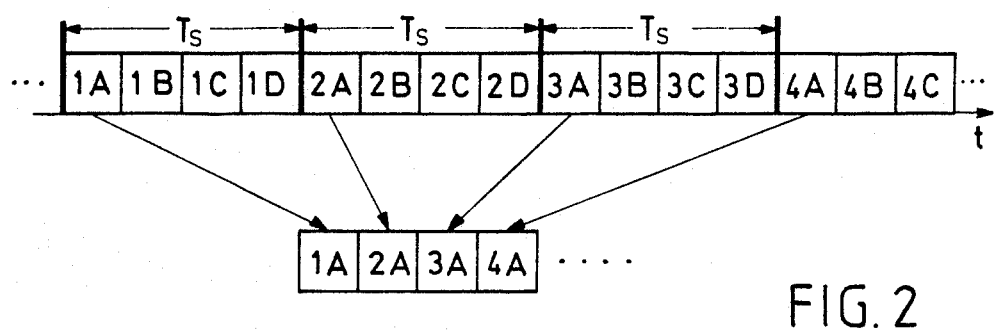
FIG. 2 shows the diagrammatic arrangement of the time windows and subintervals along the time axis in the method according to the invention.

To determine the optimum sampling time $T_A$, the baseband signal is then sampled in a number of N successive time windows, the first three of which are shown completely but the fourth one is shown only in part in FIG. 2.

Each time window has a time length of a magnitude of the symbol duration $T_S$. Each time window is also subdivided into a number of K subintervals 1A . . . 4C, the number designating the time window and the letter designating the subinterval within the time window.

In the example of FIG. 2, K=4, that is to say four subintervals 1A . . . 1D belong to the first time window, four subintervals 2A . . . 2D belong to the second time window, and so forth.

The arrangement of the N time windows with their NK subintervals must then be imagined to be placed as a time frame over the baseband signal to be evaluated. The baseband signal is then sampled in each subinterval 1A . . . 4C.

If the signal level of the baseband signal of FIG. 1B, obtained during the demodulation of the received signal, is adjusted in such a manner that, if the distortions are omitted, exactly the permitted values $+1$ and $-1$ would be assumed, sampled values located either around $+1$ and $-1$ or between these values are obtained during the sampling within the subintervals.

If the sampled value in a subinterval is greater than zero, the assumption is made that it must be considered as being the permitted value $+1$ and determines the difference between sampled value and $+1$. If, in contrast, the sampled value is less than zero, it is assumed that it must be considered as being the permitted value $-1$ and establishes the corresponding difference to this value.

If the differences determined in this manner are small, the probability is great that the received baseband signal also approximately assumes one of the permitted values in the associated subintervals. If, in contrast, the differences are great, it is probable that the associated subintervals happen to be located in a region of transition of the baseband signal between the permitted values.

While the evaluation of this sampling process for only one time window would lead to unreliable results even with a sufficiently large number of subintervals, that is to say with a fine subdivision of time, determination of the optimum sampling time $T_A$ can be made relatively reliable if the periodicity with the symbol duration $T_S$, forming the basis of the baseband, is utilized and averaged over N time windows in such a manner that always the sampled values of corresponding subintervals of each of the N time windows are combined as is diagrammatically indicated in FIG. 2 with subintervals 1A, 2A, 3A and 4A.

If then the time frame with the N time windows and NK subintervals 1A . . . 4C is situated relative to the baseband in such a manner that in each time window the permitted values, overall, relatively approximate the baseband signal for all time windows precisely in the corresponding subintervals 1A, 2A, 3A, 4A and so forth, the standard deviation of the sample values, compared to the permitted values, is particularly low. In this case, therefore, it is optimal to place the sampling time $T_A$ in each case into the first subinterval 1A, 2A, 3A, 4A and so forth of each time window. If the standard deviation is at a minimum for another sequence of corresponding subintervals, the optimum sampling time $T_A$ is located within this subinterval.

The fact that such minimum values occur at all in the standard deviation values can be easily seen in the baseband signal of FIG. 1B. The subintervals located in each case on the slopes between two permitted values provide a large contribution to the standard deviation since the value of the baseband signal is very far removed from each permitted value in this region. Accordingly, the standard deviation values are very large for these subintervals but become smaller as the subintervals are located more and more within the regions of the base band signal in which the permitted values are approximately assumed. It is therefore directly obvious that a sequence of subintervals with minimum standard deviation must exist which can then be utilized for determining the optimum sampling time.

As already mentioned, the optimum sampling time $T_A$ for the example of the baseband signal of FIG. 1B can be placed directly into those subintervals whose sampled values have the smallest standard deviation.

On the other hand, however, types of modulation are conceivable in which the least dispersion occurs in subintervals which happen to be located in the vicinity of the zero transition between two symbols. In this case, the optimum sampling time is reached by a displacement by $T_S/2$ from these subintervals.

The method is carried out in a particularly simple manner if all subintervals 1A . . . 4C are of equal length, that is to say if a single clock rate is used for sampling. In this arrangement, determination of the sampling time $T_A$ and thus the synchronization of the signal receiver becomes all the more accurate, within certain limits, the shorter the subintervals, that is to say the higher the sampling frequencies are selected.

A variable equivalent to the standard deviation is obtained in a simple manner in accordance with a preferred illustrative embodiment by determining the deviations of the sampled values from the permitted values coming closest, then squaring the deviations and summing them for corresponding subintervals over all N time windows. The resultant K sums which contain information on the standard deviation, are then compared with each other and from this the sequence of subintervals with the least standard deviation is determined.

The method described can be carried out particularly reliably if the signal processing in the above sense is followed by smoothing by means of a median filter.

The averaging, that is to say the summing over N time windows and also any median filtering create a delay in the determination of the sampling time $T_A$. This delay can be advantageously compensated by a delay line connected into the data path, for example a digital delay line, in such a manner that clock and data are determined from the same signal section and are thus matched to each other. The correct time coordination is achieved by selecting a delay time of $NT_S/2$ so that the sampling time is referred to the time center of the evaluated signal section.

Figure 3:
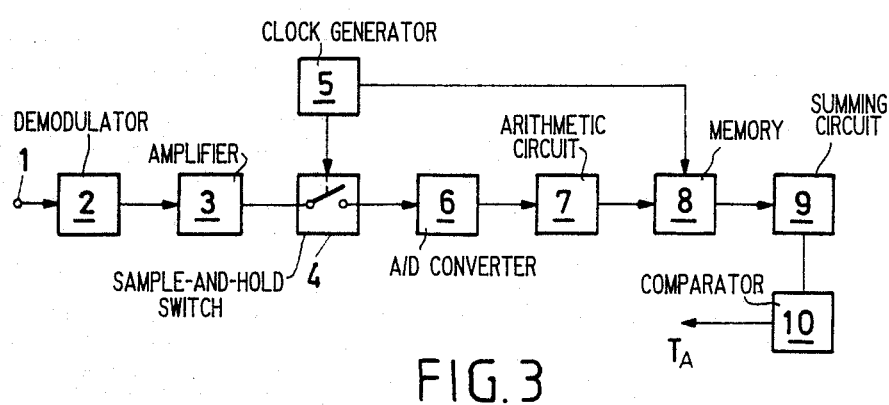
FIG. 3 shows the circuit for determining the sampling time according to the method of the invention for a binary baseband signal shown in FIG. 1A and 1B.

The block diagram of an illustrative circuit for determining the sampling time $T_A$ in accordance with the method described above is shown in FIG. 3. The received signal passes from a signal input 1 into a demodulator 2 at the output of which the received baseband signal according to FIG. 1B appears. A subsequent amplifier 3 adjusts the signal level of the received baseband signal in such a manner that, in the undistorted state, precisely the permitted values (for example $+1$ V and $-1$ V) are assumed.

The demodulated baseband signal is sampled via a sample-and-hold switch 4, driven by a clock generator 5, in the time intervals corresponding to the subintervals and the sampled values are digitized in an A/D convertor 6. A subsequent arithmetic circuit 7 determines the deviations of the sampled values from the nearest permitted values, squares these deviations and passes the squared values to a memory 8 where they are stored in a total of NK storage locations for N successive time windows.

Under the control of the clock generator 5, the values are then read out of the memory 8, in each case ordered by corresponding subintervals, and supplied to a summing circuit 9 which forms the sums for each group of subintervals and passes them to a comparator 10 which, by comparing them, determines the smallest sum from the sums and from this determines the optimum sampling time $T_A$.

Another illustrative embodiment of the method according to the invention is based on a phase-modulated received signal in the form of a CPM (Continuous Phase Modulation) signal. At particular points of time, which are periodic with respect to the predetermined symbol duration $T_S$, such a signal is located in M phase regions of minimum extent in the two-dimensional phase space. $M=2$ in the extreme case of a binary CPM signal. Analogously to the baseband signal of FIG. 1B, which is located in value regions of minimum extent around the permitted values $+1$ and $-1$ at particular points of time which are periodic with $T_S$, the CPM signal selected in accordance with the above example is located in two phase regions of minimum extent, for example regions around $\pi/2$ and $3\pi/2$ referred to the reference phase of the unmodulated carrier oscillation.

Figure 4A:
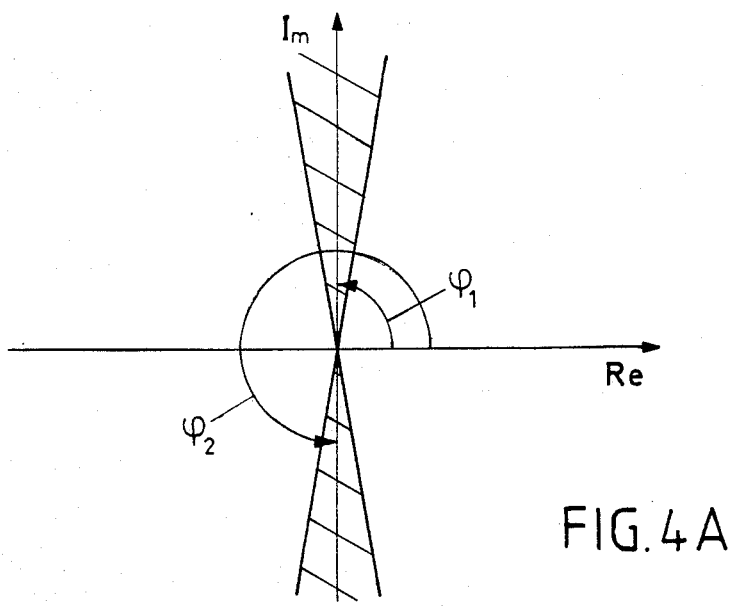
FIG. 4A shows the two phase regions of minimum extent in the phase space for a binary CPM (Continuous Phase Modulation) signal.

In FIG. 4A, these two phase regions of minimum extent are represented as shaded areas in the two-dimensional phase space generated by the real and imaginary axis. The phases $\phi_1$ and $\phi_2$, in this case $\pi/2$ and $3\pi/2$ represent the permitted phase values.

If then in a binary CPM signal of the abovementioned type the phase values are sampled in the subintervals within the same time frame as is shown in FIG. 2 by way of example, the sample values are also dispersed more or less extensively around the corresponding phase values as a function of the subinterval, there being at least one time region per time window in which the standard deviation is minimal.

Figure 4B:
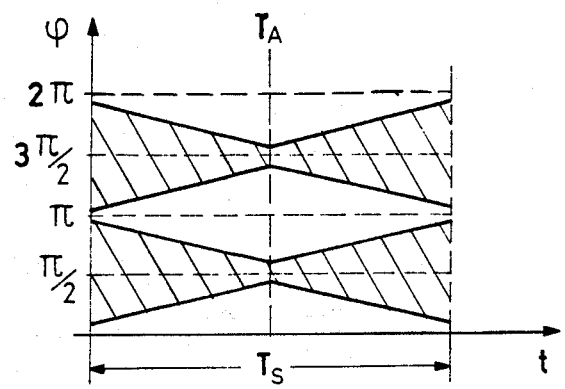
FIG. 4B shows the eye pattern of phase of a distorted signal according to FIG. 4A.

The dispersion of the values within a time window of length $T_S$ is located within particular areas which are shown shaded in FIG. 4B. The synchronization between the received signal and the time frame has here been selected precisely in such a manner that the sampling time $T_A$ is located precisely in the center of the time window. At the same time, the sampling time $T_A$ corresponds to the minimum of the standard deviation. The overall representation is called "eye pattern of phase".

For subintervals at the start and at the end of the time window, the sampled values are relatively extensively dispersed around the phase values $\pi/2$ and $3\pi/2$. The standard deviation decreases towards the center and reaches a minimum from which the sampling time $T_A$ can be determined. Depending on the position of the time frame relative to the timing of the received signal, the minimum can also be located outside the center of the time window.

To simplify the signal processing, it is initially suitable to image, that is to say to reduce, the plurality of phase regions of minimum extent to one phase region. In the case of phase-modulated signals having M equidistant phase regions which are correspondingly allocated to M discrete phase values, such imaging is achieved by raising the received signal to the power of M because the original distances of $2\pi/M$ between the discrete phase values then become distances of $2\pi$ so that all possible phase values fall within the same phase region.

Figure 4C:
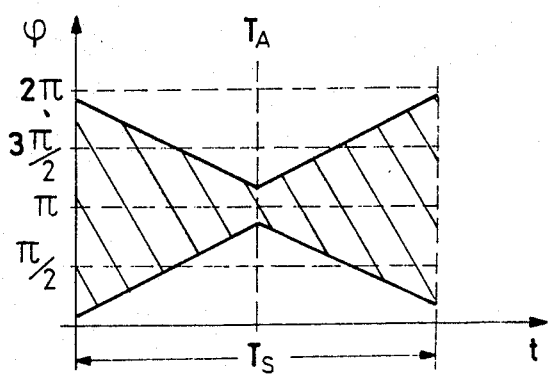
FIG. 4C shows the two phase regions according to FIG. 4B imaged onto a phase region of minimum extent.

Correspondingly, instead of the eye pattern of phase from FIG. 4B, a new eye pattern of phase according to FIG. 4C, which now only comprises one shaded area, is obtained for the received signal raised to a higher power.

Starting with the received signal raised to a higher power, the signal is then split into two quadrature branches so that the components of the phase vector can be scalarly determined.

Sampling of N time windows and in NK subintervals then takes place separately for each of the quadrature branches as already described. Similarly, the standard deviations of the sampled values for equivalent subintervals over the N time windows are separately calculated for each quadrature branch. Finally, the standard deviations from both quadrature branches are combined in pairs and are compared with each other to determine the sequence of the subintervals having the smallest standard deviation and to derive from this the optimum sampling time $T_A$.

Figure 5:
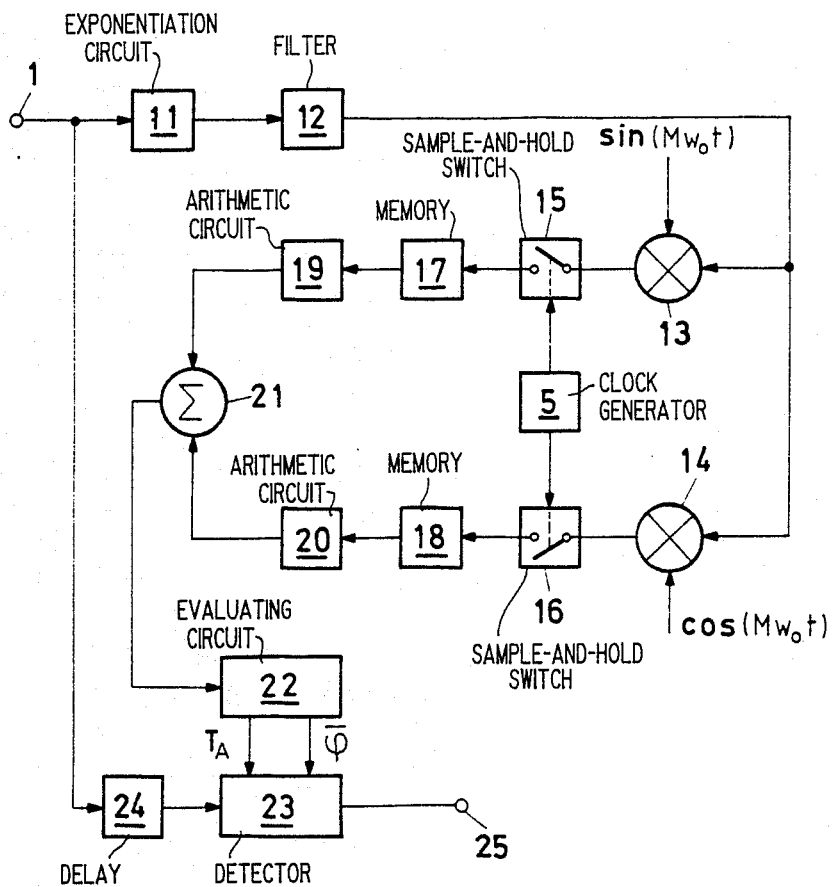
FIG. 5 shows the circuit for clock synchronization of a received phase-modulated signal (CPM signal).

FIG. 5 shows the block diagram of an illustrative circuit for processing a phase-modulated signal. From the singal input 1, the signal having M equidistant phase regions reaches an exponentiating circuit 11 followed by a filter 12 in which circuits the imaging of the M phase regions to one phase region is effected by raising them to the power of M.

The signal thus imaged is divided and multiplied in parallel in each case by a signal proportional to sin ($Mw_ot$) and cos ($Mw_ot$) into multipliers 13 and 14, $w_o$ being the carrier frequency of the received signal. The multiplication causes the signal to be demodulated and to be split into two quadrature branches which are sampled in parallel by two sample-and-hold switches 15 and 16 driven by a clock generator 5. Following the sample-and-hold switches 15 and 16, an A/D convertor can again be provided as in the circuit of FIG. 3. Corresponding A/D convertors are omitted in FIG. 5 for the sake of simplicity.

The sampled values are stored in subsequent memories 17 and 18. Subsequent arithmetic circuits 19 and 20 calculate the standard deviations for each quadrature branch which are then combined in pairs in a summing circuit 21 and are passed onto an evaluating circuit 22 in which the optimum sampling time $T_A$ is determined and supplied to a signal detector 23. The information extracted from the received signal can then be picked up at the signal output 25.

As has already been mentioned, a delay occurs during synchronization which is compensated in the data path. For this purpose, the detector 23 is preceded by a delay line 24 the input of which is connected to the signal input 1.

To be able to coherently demodulate a phase-modulated signal, the receiver must also be rigidly coupled to the reference phase of the carrier frequency, in addition to clock synchronization. For this purpose, the mean value for corresponding subintervals over the N time windows is also calculated, in addition to the standard deviation in the quadrature branches, in a preferred embodiment of the method according to the invention. In this manner, a mean phase value $\bar{\phi}$, which can be used as phase offset with respect to the reference phase of the carrier oscillation, is made available for the optimum sampling time $T_A$. In the circuit according to FIG. 5, this is indicated by the fact that the evaluating circuit 22 also supplies, in addition to the optimum sampling time $T_A$, the mean phase value $\bar{\phi}$ to the detector 23.

Over the period of N time windows, the standard deviation and the mean values are calculated K-times and separately for the two quadrature branches. This results in a comparatively long computing time which is not necessary whenever the sampled values do not change very much.

For this reason, in order to reduce the computing time needed to correct the last K mean values calculated in each case, the oldest sampled values may be omitted during determination of the mean values and the last calculated K mean values may be updated by adding the latest sampled values, without having to repeat the entire process of forming mean values.

On the other hand, updating of the K dispersions is always possible whenever the newly obtained mean values deviate by less than a predetermined value from a stored reference mean value. However, if the deviation is greater, recalculation of the standard deviations and storing of a new reference mean value becomes necessary.

Overall, the method according to the invention for clock synchronization of a signal receiver provides a method which allows a reliable and simple determination of the optimum sampling time $T_A$ within predetermined time windows without significantly delaying the signal evaluation.

Obviously, numerous modifications and variations of the present invention are possible in light of the above teachings. It is therfore to be understood that within the scope of the appended claims, the invention may be practiced otherwise than as specifically described herein.

What is claimed as new and desired to be secured by Letters Patent of the United States is:

1. Method for clock synchronization of a signal receiver with respect to a received signal modulated with data in the form of a baseband signal, in which method the baseband signal, in the undistributed state, can assume a plurality of permitted values at particular points of time which are periodically related to a predetermined symbol duration, and in which method the generating data sequence is scrambled in such a manner that transitions between the permitted values largely occur with the same frequency within arbitrary time windows, wherein the method comprises the steps of:
   (a) demodulating the received signal;
   (b) sampling in each subinterval (1A ... 4C) in a number of N successive time windows which have in each case the length of one symbol duration, $T_S$, and are subdivided into K subintervals (1A ... 4C) the demodulated received signal;
   (c) determining the standard deviation of the sampled values over the N time windows for corresponding subintervals (1A ... 4C) of each time window; and
   (d) comparing the K determined standard deviations with each other and deriving from the position in time of the smallest of these standard deviations the sampling time $(T_A)$ within each time wndow at which sampling time $(T_A)$ the demodulated received signal is to be sampled for recovering the data.

2. Method as claimed in claim 1, wherein
   (a) the subintervals (1A ... 4C) are of equal length;
   (b) the deviation of the demodulated received signal from one of the permitted values which is nearest in each case is measured;
   (c) the measured deviations are squared; and
   (d) the squared deviations for corresponding subintervals (1A ... 4C) are summed over the N time windows and the K sums are compared with each other.

3. Method as claimed in claim 2, wherein
   (a) the baseband signal is a binary signal with the permitted values $+1$ and $-1$;
   (b) the received signal, after demodulation, is sampled and digitized in each subinterval (1A ... 4C); and
   (c) in the case of positive sampled values, the difference to $+1$ and, in the case of negative sampled values, the difference to $-1$ is formed and the differences are used as deviations for determining the sampling time $(T_A)$.

4. Method as claimed in claim 1, wherein the delay caused by the determination of the sampling time $(T_A)$ is compensated by a delay line being supplied in front of a signal detector and the duration of delay is $NT_S/2$.

5. Method as claimed in claim 1, wherein
   (a) the received signal is a phase-modulated signal which, at particular points of time periodically related to the predetermined symbol duration $(T_S)$ is correspondingly located in M phase regions of minimum extent in the two-dimensional phase space;
   (b) the received signal is processed in such a manner that the M phase regions of minimum extent are imaged to one phase region;
   (c) the received signal is split into two quadrature branches for scalar signal processing;
   (d) each quadrature branch is separately sampled in the subintervals (1A ... 4C) and the standard deviation is calculated from the sampled values; and (e) the K standard deviation values of both quadrature branches, thus formed, are combined in pairs and are subsequently compared.

6. Method as claimed in claim 5, wherein the M phase regions of minimum extent are equidistant and the imaging to one phase region is effected by raising the received signal to the power of M.

7. Method as claimed in claim 5, wherein the point of time associated with the subinterval having the least standard deviation is used as sampling time ($T_A$).

8. Method as claimed in claim 5, wherein a sampling time ($T_A$) is used which is displaced by one half of the symbol duration ($T_S$) with respect to the point of time associated with the subinterval having the least standard deviation.

9. Method as claimed in claim 5, wherein, in addition to the standard deviation of the sampled values of corresponding subintervals (1A ... 4C) of N time windows, for each subinterval a mean value is formed out of the sampled values of corresponding subintervals of N time windows and the mean value belonging to the subinterval which serves to derive the sampling time ($T_A$) is used as phase offset with respect to the carrier frequency ($W_o$) of the received signal with its reference phase.

10. Method as claimed in claim 9, wherein the mean values are stored for reducing the computing time during determination of the mean values and the last K mean values are in each case corrected by omitting the oldest sampled values and are updated by adding the latest sampled values.

* * * * *